(12) United States Patent
Fujinaka

(10) Patent No.: US 11,194,117 B2
(45) Date of Patent: Dec. 7, 2021

(54) LENS BARREL

(71) Applicant: Panasonic Intellectual Property Management Co., Ltd., Osaka (JP)

(72) Inventor: Hiroyasu Fujinaka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 32 days.

(21) Appl. No.: 16/761,376

(22) PCT Filed: Jul. 11, 2018

(86) PCT No.: PCT/JP2018/026215
§ 371 (c)(1),
(2) Date: May 4, 2020

(87) PCT Pub. No.: WO2019/092921
PCT Pub. Date: May 16, 2019

(65) Prior Publication Data
US 2020/0363604 A1    Nov. 19, 2020

(30) Foreign Application Priority Data
Nov. 9, 2017 (JP) .............................. JP2017-216160

(51) Int. Cl.
G02B 7/02       (2021.01)
G02B 7/04       (2021.01)

(52) U.S. Cl.
CPC ............... G02B 7/021 (2013.01); G02B 7/04 (2013.01)

(58) Field of Classification Search
CPC .................................. G02B 7/021; G02B 7/04
(Continued)

(56) References Cited

U.S. PATENT DOCUMENTS 4,707,083 A * 11/1987 Iizuka .................. G02B 7/04
                                                   359/700
8,218,249 B2    7/2012 Yamauchi
(Continued)

FOREIGN PATENT DOCUMENTS

JP    S62-112109 A    5/1987
JP    2003-043331 A   2/2003
(Continued)

OTHER PUBLICATIONS

Japanese Office Action for corresponding application No. 2019-551897 dated Mar. 9, 2021.
(Continued)

Primary Examiner — Mahidere S Sahle
(74) Attorney, Agent, or Firm — Renner, Otto, Boisselle & Sklar, LLP

(57) ABSTRACT

The lens barrel disclosed herein comprises cam pin (3a, 3b, and 3c) fixed and supported by a lens holding frame (1); a biasing pin (4) that is biased and supported near one cam pin (3a) of the lens holding frame (1); and a cam frame (6) that has cam grooves that engage with each of the cam pins (3a, 3b, and 3c) and the biasing pin (4). The cam groove (7d) that engages with the biasing pin (4) engages with the biasing pin (4) on one side surface in the optical axis direction, and the cam groove (7a) that engages with the cam pin (3a) near the biasing pin (4) engages with the cam pin (3a) on the side surface on the opposite side in the optical axis direction from the side surface that engages with the biasing pin (4).

8 Claims, 17 Drawing Sheets

(58) Field of Classification Search
USPC .................................................. 359/819–830
See application file for complete search history.

(56) References Cited

U.S. PATENT DOCUMENTS

| | | |
|---|---|---|
| 9,134,589 B2 | 9/2015 | Ito |
| 9,715,081 B2 | 7/2017 | Shishido |
| 2011/0157729 A1 | 6/2011 | Yamauchi |
| 2014/0376103 A1 | 12/2014 | Ito |
| 2016/0161704 A1 | 6/2016 | Shishido |

FOREIGN PATENT DOCUMENTS

| | | | |
|---|---|---|---|
| JP | 2003-227992 A | 8/2003 | |
| JP | 2005-182089 A | 7/2005 | |
| JP | 2007-249250 A | 9/2007 | |
| JP | 2008-020488 A | 1/2008 | |
| JP | 2011-138079 A | 7/2011 | |
| JP | 2015-026062 A | 2/2015 | |
| JP | 2016-109859 A | 6/2016 | |
| JP | 2016-114799 A | 6/2016 | |

OTHER PUBLICATIONS

PCT/JP2018/026215 International Search Report dated Sep. 11, 2018.

\* cited by examiner

LENS BARREL

TECHNICAL FIELD

The present disclosure relates to a lens barrel used in a digital still camera or the like.

BACKGROUND ART

A conventional a lens barrel used in an imaging device such as a digital still camera has a plurality of lenses that constitute an optical system, a lens holding frame that holds the lenses, and a cam frame that varies the position of the lens holding frame according to zoom.

If the position of the lenses deviates even a little, the resolution of the imaging device will suffer. Furthermore, if the lens holding frame is loose during zooming, the focus will deviate and the image will be blurred.

Also, in recent years, the number of pixels of imaging devices has been rising along with the increase in the number of pixels in display devices for viewing images (television sets, PC monitors, etc.), and blurriness and image shake that would not have been objectionable in the past is becoming noticeable, so improvement is desired in this area.

To deal with the above problem, a number of structures for suppressing looseness of the lens holding frame have been disclosed in the past.

For example, with the lens barrel disclosed in Patent Literature 1, a structure is disclosed in which a cam pin is biased by a spring to reduce looseness between the cam groove and the cam pin.

Also, the lens barrel disclosed in Patent Literature 2 has a cylindrical first frame having two cam curves congruent with each other and having a pair of cam grooves separated from each other on the peripheral surface; a pair of cam pins consisting of a first cam pin that engages with one of the pair of cam grooves and a second cam pin that engages with the other of the pair of cam grooves; and a holder in which the fixed end of either the first cam pin or the second cam pin is fixed to a shape portion of the first frame that is elastically deformable in the radial direction. A structure is disclosed in which a second frame that moves relative to the first frame in the optical axis direction is provided, and in the engagement between the pair of cam pins and the pair of cam grooves, the distance between the pair of cam pins is different from the distance between the pair of cam grooves.

CITATION LIST

Patent Literature

Patent Literature 1: JP-A S62-112109
Patent Literature 2: JP-A 2016-109859

SUMMARY

Technical Problem

The present disclosure provides a high-performance lens barrel with which looseness of the lens holding frame can be reduced, and the position of the lens holding frame can be fixed.

Solution to Problem

The lens barrel disclosed herein comprises a lens holding frame that holds lenses; one or more cam pins that are fixed and supported by the lens holding frame; one biasing pin that is biased and supported near one of the cam pins of the lens holding frame; and a cam frame that has cam grooves that engage with each of the cam pins and the biasing pin. The cam groove that engages with the biasing pin engages with the biasing pin on one side surface in the optical axis direction, and the cam groove that engages with the cam pin near the biasing pin engages with the cam pin on the side surface on the opposite side in the optical axis direction from the side surface that engages with the biasing pin.

Advantageous Effects

The lens barrel disclosed herein can provide a high-performance lens barrel with which looseness of the lens holding frame can be reduced, and the position of the lens holding frame can be fixed.

DESCRIPTION OF EMBODIMENTS

Knowledge Underlying the Present Disclosure

The inventors have learned that the following problem is encountered with Patent Literature 1 described in the above section of "Background Art."

With the configuration of the lens barrel disclosed in Patent Literature 1, looseness between the cam grooves and the cam pins is indeed completely suppressed by the cam pins biased by springs, but the springs put the cam pins in a state of being movable in the radial direction, so a certain amount of clearance is always required between the lens holding frame and the cam pins, and the position of the lens holding frame cannot be completely fixed due to looseness in this portion.

Also, the inventors have learned that the following problem is encountered with Patent Literature 2 described in the above section of "Background Art."

With the configuration of the lens barrel disclosed in Patent Literature 2, the lens holding frame is indeed held without any looseness, but the position of the lens holding frame is not completely fixed.

This problem will be briefly described with reference to FIGS. 9A and 9B.

Figure 9A:
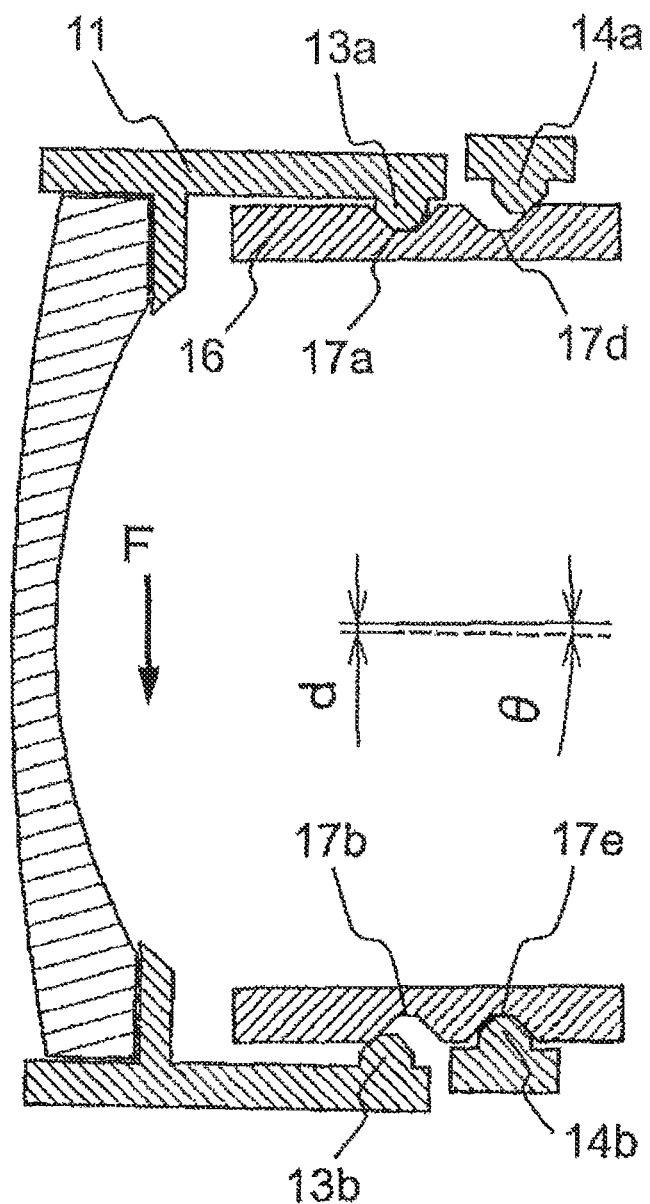
FIG. 9A is a schematic cross section of a conventional lens barrel.
Figure 9B:
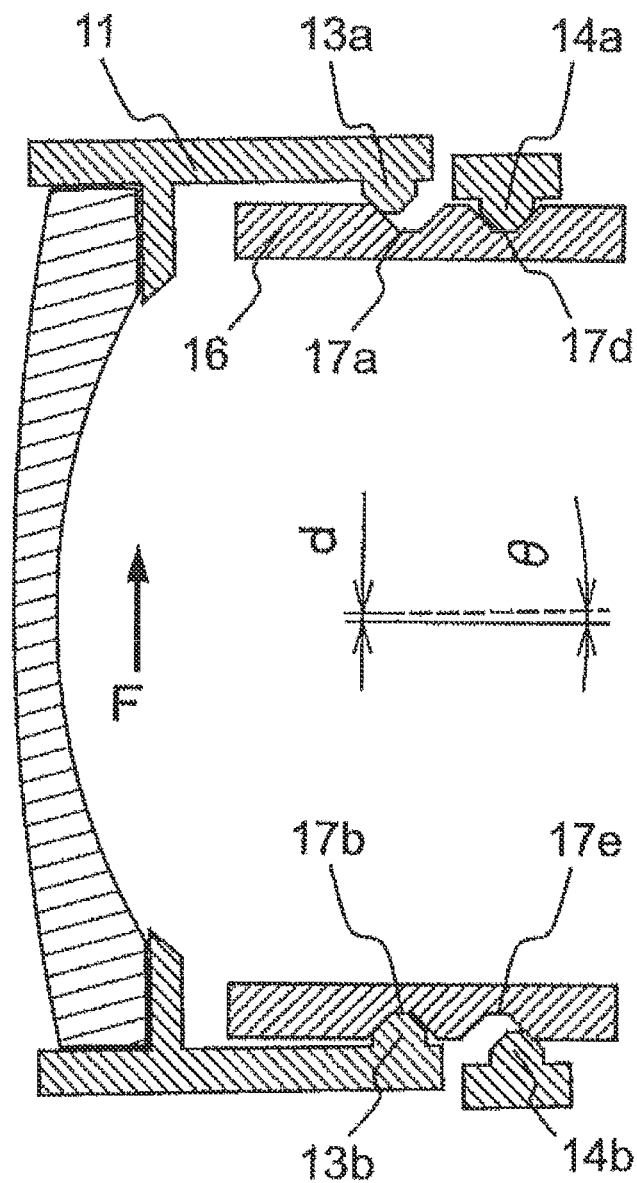
FIG. 9B is a schematic cross section of a conventional lens barrel.

FIGS. 9A and 9B are schematic diagrams showing a state in which the lens holding frame is held in the configuration of the lens barrel disclosed in Patent Literature 2.

The lens barrel disclosed in Patent Literature 2 has a configuration in which there are three fixed cam pins and three cam pins provided in an elastically deformable portion.

FIG. 9A shows a state in which a force F (such as gravity) is applied that pulls the entire lens holding frame 11 downward in the drawing.

The lens barrel disclosed in Patent Literature 2 has three fixed cam pins and three elastically deformable cam pins, but for the sake of simplicity, only two of each are shown.

In FIG. 9A, the fixed cam pin 13a receives a force F, and the distal end portion moves in the direction of approaching the bottom of the cam groove 17a. At this point the biasing cam pin 14a moves away from the bottom of the cam groove 17d so that there is no looseness between the fixed cam pin 13a and the cam groove 17a.

Meanwhile, the fixed cam pin 13b on the opposite side receives the force F and the distal end portion moves in the direction away from the bottom of the cam groove 17b. At this point the biasing cam pin 14b moves in the direction of approaching the bottom of the cam groove 17b so that there is no looseness between the fixed cam pin 13b and the cam groove 17e.

FIG. 9B shows a state that is the opposite of that in FIG. 9A, in which the force F is exerted so that the entire lens holding frame 11 is pulled in upward in the drawing (for example, when the lens holding frame 11 is used in an upside-down orientation).

In FIG. 9B, the fixed cam pin 13a receives the force F and the distal end portion moves in the direction of away from the bottom of the cam groove 17a. At this point the biasing cam pin 14a moves in the direction of approaching the bottom of the cam groove 17d so that there is no looseness between the fixed cam pin 13a and the cam groove 17a.

Meanwhile, the fixed cam pin 13b on the opposite side receives the force F and the distal end portion moves in the direction of approaching the bottom of the cam groove 17b. At this point the biasing cam pin 14b moves in the direction of away from the bottom of the cam groove 17b so that there is no looseness between the fixed cam pin 13b and the cam groove 17b.

Here, if we look at the orientation of the lens holding frame 11 in FIGS. 9A and 9B, we see that the direction of the inclination $\theta$ and the eccentricity d of the center axis of the lens holding frame 11 indicated by the broken line in the drawings is reversed from that of the center axis of the cam frame 16 indicated by the solid line in the drawings.

That is, this shows that the orientation of the lens holding frame is not sufficiently fixed with the configuration of the lens barrel disclosed in Patent Literature 2.

In order to solve this problem, the lens barrel according to an embodiment of the present disclosure comprises a lens holding frame that holds lenses; one or more cam pins that are fixed and supported by the lens holding frame; one biasing pin that is biased and supported near one of the cam pins of the lens holding frame; and a cam frame that has cam grooves that engage with each of the cam pins and the biasing pin. The cam groove that engages with the biasing pin engages with the biasing pin on one side surface in the optical axis direction, and the cam groove that engages with the cam pin near the biasing pin engages with the cam pin on the side surface on the opposite side in the optical axis direction from the side surface that engages with the biasing pin.

Consequently, looseness of the lens holding frame can be reduced, and the position of the lens holding frame can be properly fixed. Therefore, it is possible to prevent a drop in resolution due to the orientation in which the camera is held (for example, vertically or horizontally).

Also, particularly when capturing a moving picture while zooming, since looseness of the lens holding frame can be reduced, a high-performance lens barrel can be provided in which loss of focus or image blurring caused by looseness of the lens holding frame during zooming can be prevented.

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

Embodiment 1 will now be described with reference to FIGS. 1A to 4B.

1. Configuration of Lens Barrel

Figure 1A:
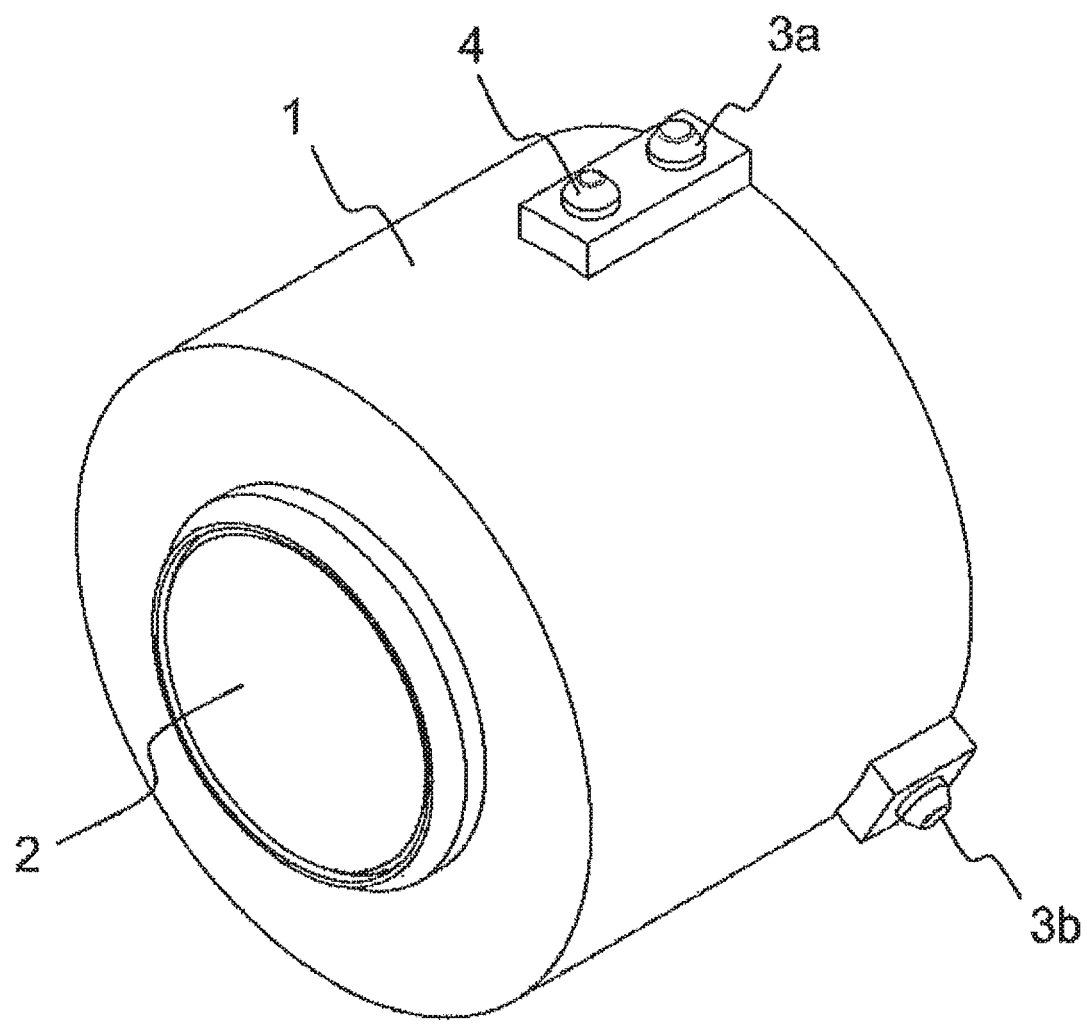
FIG. 1A is an oblique view of the configuration of a lens holding frame unit in Embodiment 1.
Figure 1B:
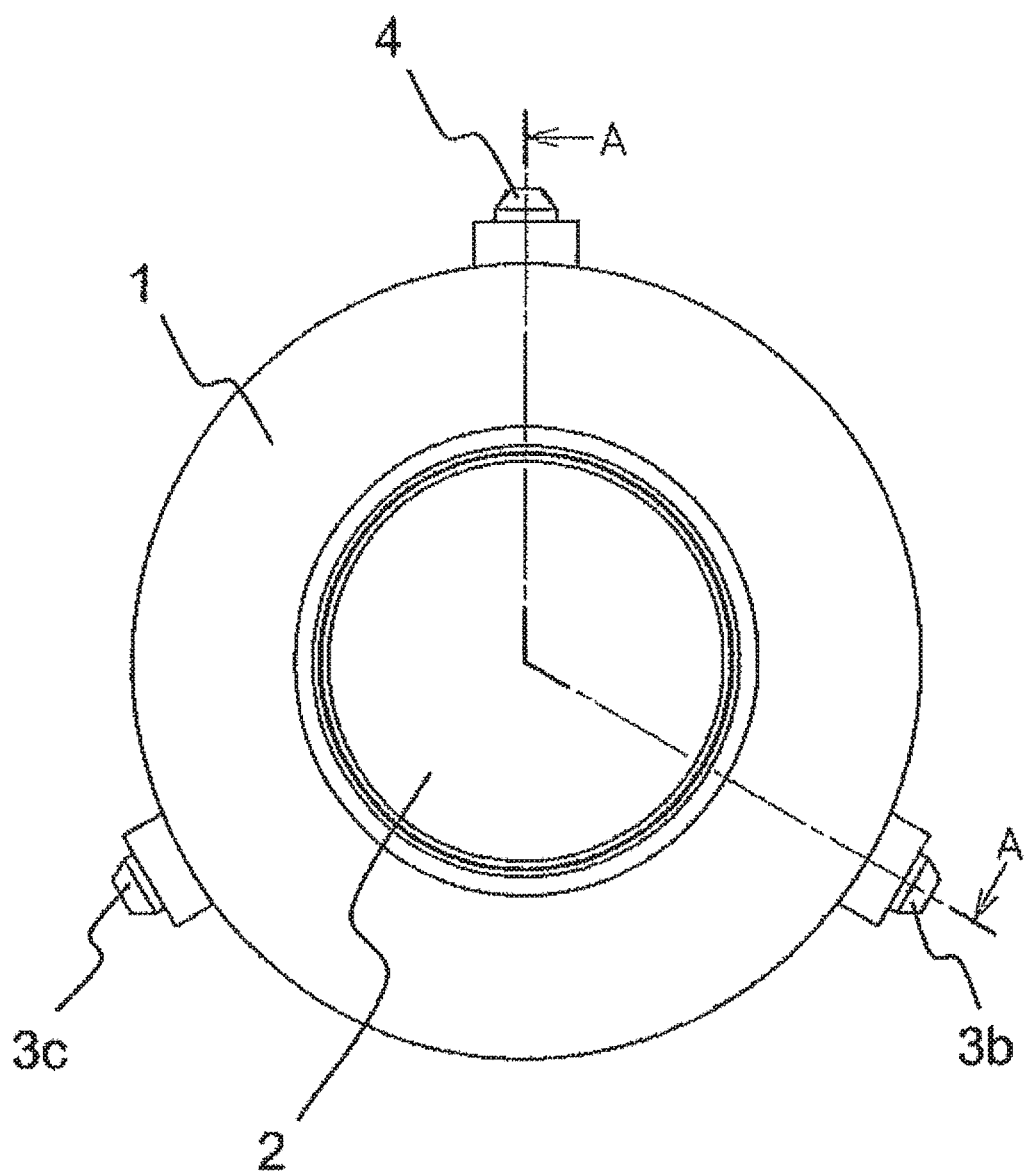
FIG. 1B is a front view of the configuration of the lens holding frame unit in Embodiment 1.

FIGS. 1A and 1B are diagrams of the configuration of a lens holding frame 1 in Embodiment 1.

Figure 1C:
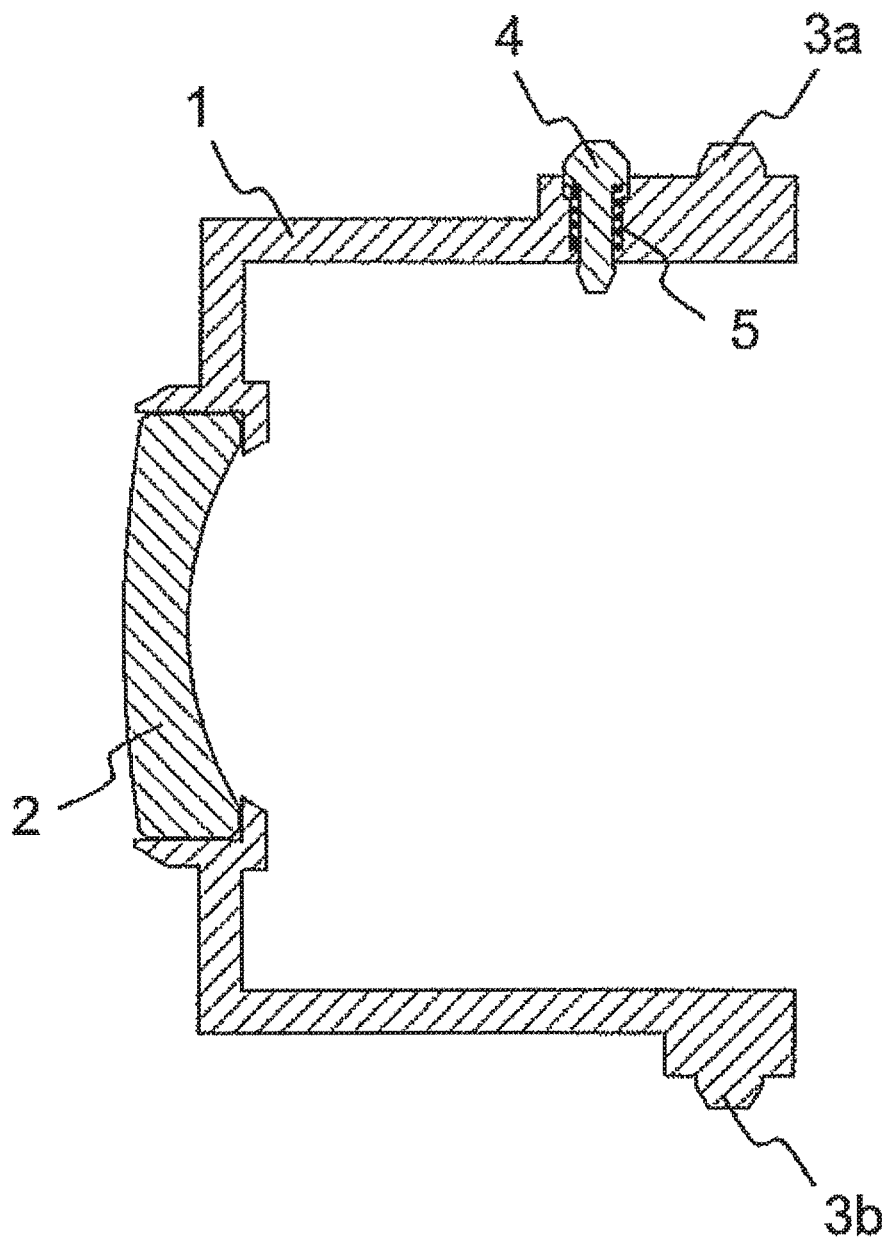
FIG. 1C is a cross section along the A-A line in FIG. 1B.

FIG. 1A is an oblique view, FIG. 1B is a front view, and FIG. 1C is an A-A cross section.

In FIG. 1, a lens holding frame 1 has a substantially cylindrical shape and is produced by resin injection molding or the like. A lens 2 constituting the optical system is fixed to the inner peripheral portion. Three substantially truncated-conical cam pins 3a, 3b, and 3c are integrally molded from resin on the outer peripheral portion.

In FIG. 1, the cam pins 3a, 3b, and 3c are equidistantly provided at three places in the circumferential direction around the lens holding frame 1, but a biasing pin 4 is supported near the cam pin 3a in the outside diameter direction (upward in the drawing).

The biasing pin 4 is produced by metal cutting, and is biased by a compression coil spring 5 in the radial direction of the lens holding frame 1 (upward in the drawing).

Figure 2A:
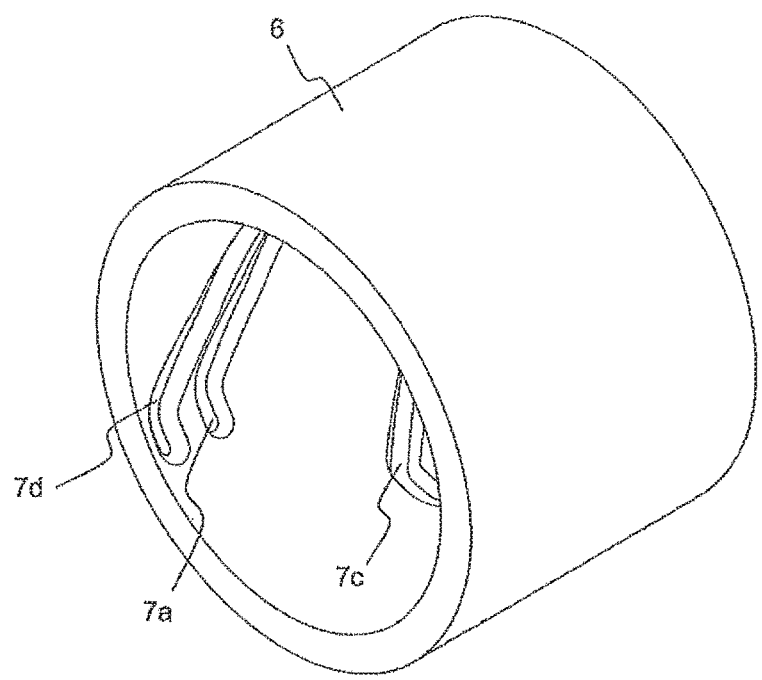
FIG. 2A is an oblique view of the configuration of a cam frame in Embodiment 1.
Figure 2B:
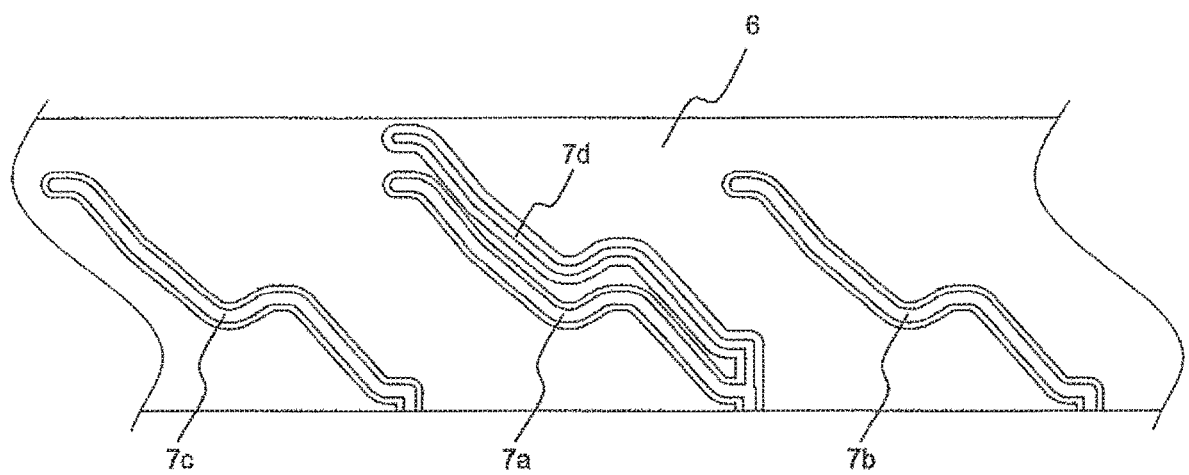
FIG. 2B is a development view of the inner surface of the cam frame in FIG. 2A.

FIGS. 2A and 2B are diagrams showing the configuration of a cam frame 6.

FIG. 2A is an oblique view of the cam frame 6, and FIG. 2B is a development view of the inner surface of the cam frame 6.

In FIGS. 2A and 2B, the cam frame 6 is produced by resin injection molding or the like.

In FIG. 2B, cam grooves 7a, 7b, and 7c are equidistantly provided at three places to engage respectively with the cam pins 3a, 3b, and 3c of the lens holding frame 1. This allows the cam pins 3a, 3b, and 3c to slide along the corresponding cam grooves 7a, 7b, and 7c. A cam groove 7d corresponding to the biasing pin 4 of the lens holding frame 1 is formed alongside the cam groove 7a.

This allows the biasing pin 4 to slide along the cam groove 7d. These four cam grooves 7a, 7b, 7c, and 7d are all produced with the same track.

The spacing between the cam groove 7a engaging with the cam pin 3a and the cam groove 7d engaging with the biasing pin 4 is slightly smaller than the spacing between the cam pin 3a and the biasing pin 4 provided to the lens holding frame unit.

When the lens holding frame 1 and the cam frame 6 are configured as described above, looseness of the lens holding frame 1 with respect to the cam frame 6 can be suppressed well, and the orientation of the lens holding frame 1 with respect to the cam frame 6 is properly fixed.

The reason for this will be described in detail.

Figure 3A:
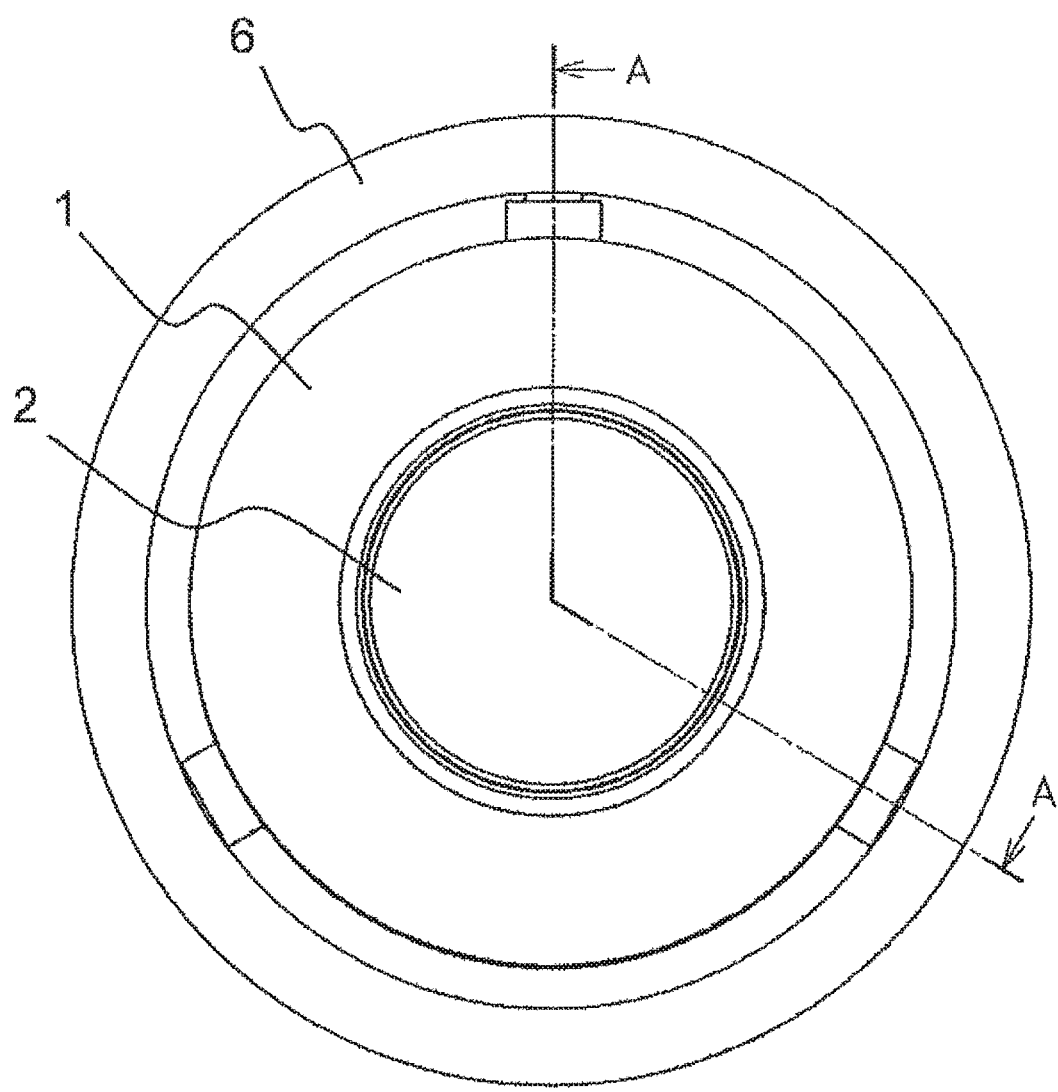
FIG. 3A shows a state in which the lens holding frame unit and the cam frame according to Embodiment 1 are assembled.
Figure 3B:
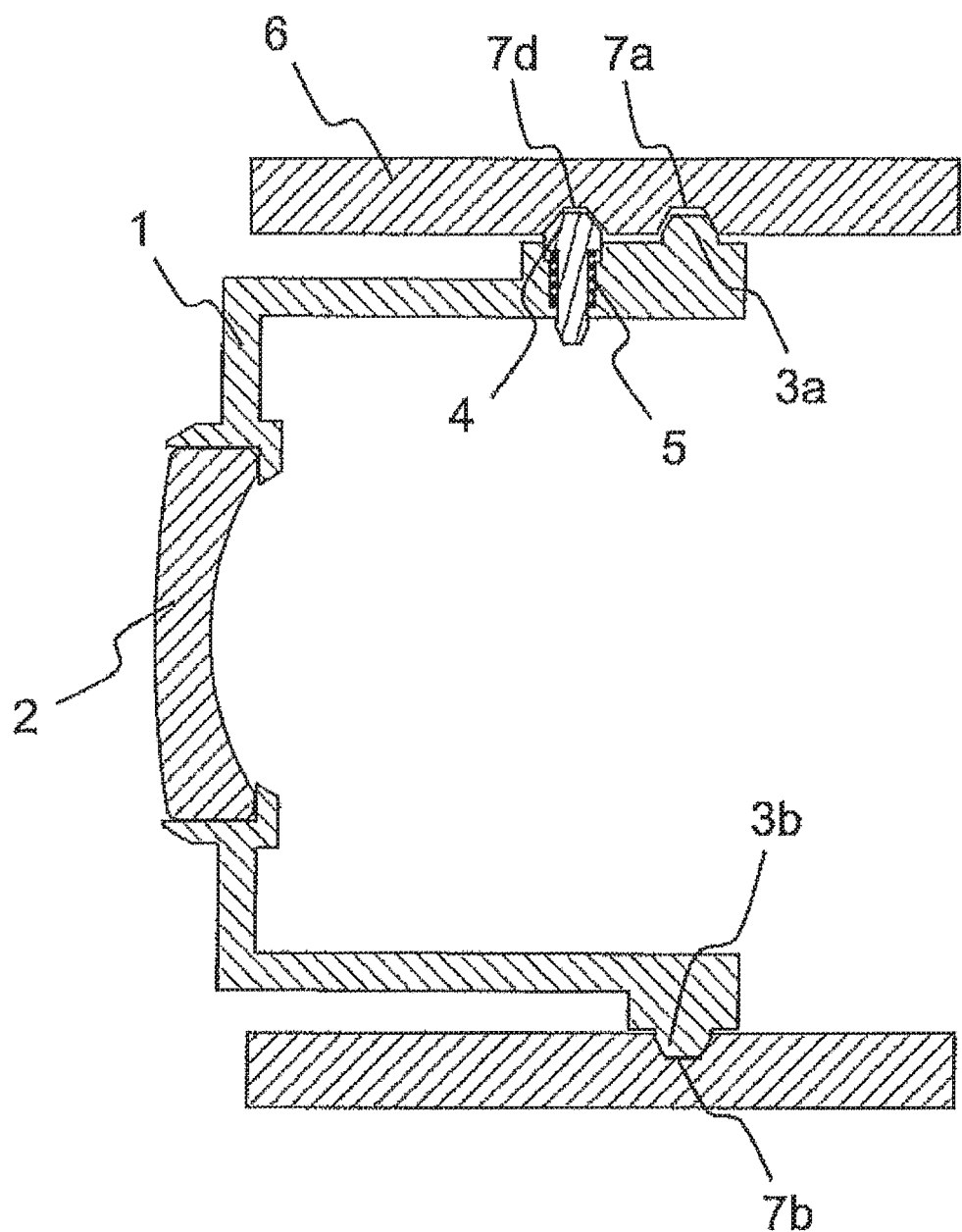
FIG. 3B is a cross section along the A-A line in FIG. 3A.

FIGS. 3A and 3B are diagrams showing a state in which the lens holding frame 1 and the cam frame 6 have been put together.

FIG. 3A is a front view, and FIG. 3B is an A-A cross section.

Figure 4A:
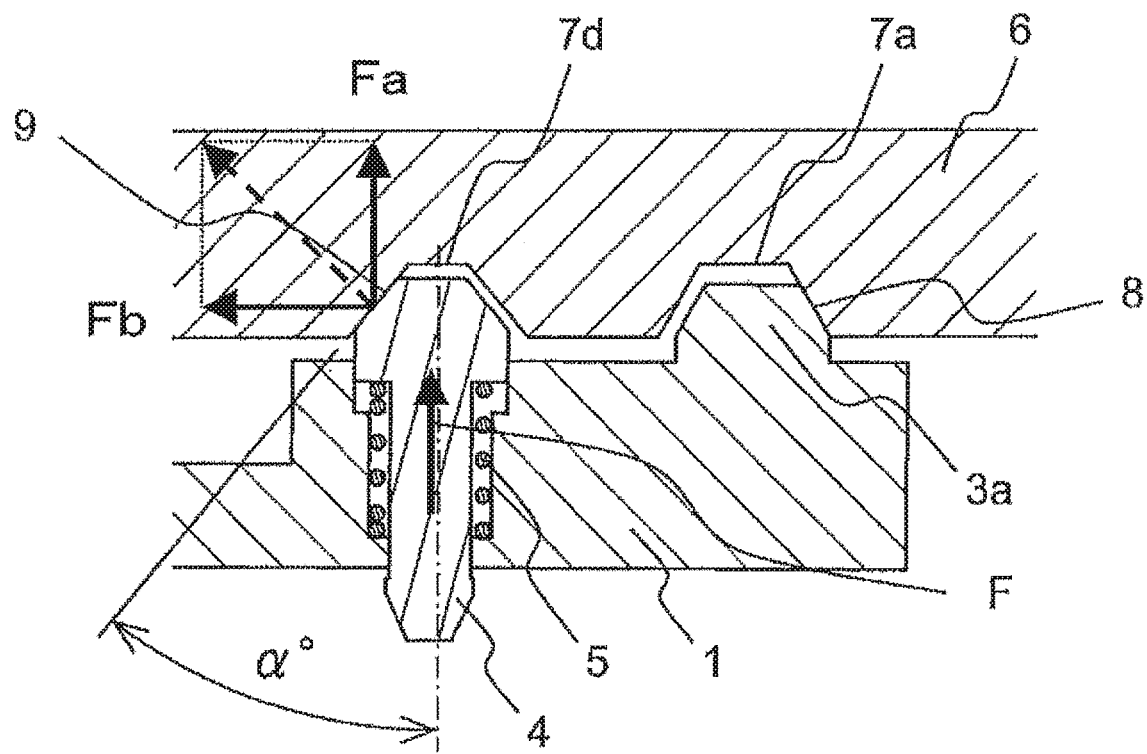
FIG. 4A is a cross sectional detail view of the engaged state of the cam pins, biasing pin, and cam grooves according to Embodiment 1.
Figure 4B:
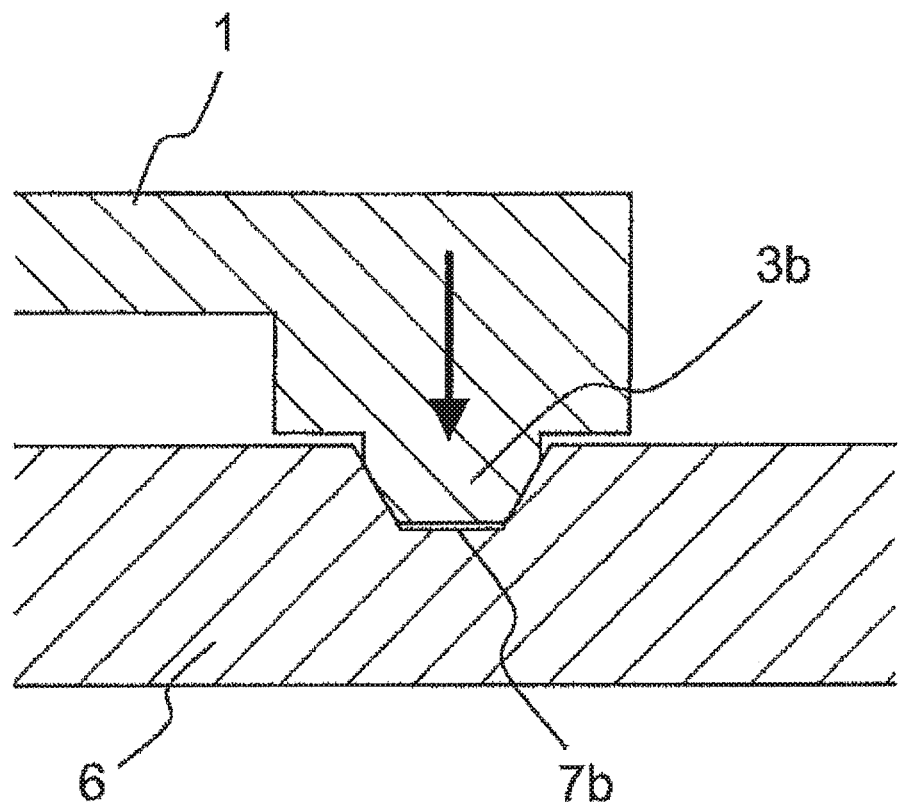
FIG. 4B is a cross sectional detail view of the engaged state of the cam pins, biasing pin, and cam grooves according to Embodiment 1.

FIGS. 4A and 4B are cross sectional detail views of the engaged state of the cam pin 3a, the biasing pin 4, and the cam groove, and are enlarged views of main parts in FIG. 3B.

FIG. 4A is a cross sectional detail view of the vicinity of the cam pin 3a and the biasing pin 4.

In FIG. 4A, since the biasing pin 4 is biased by a compression coil spring 5, it constantly receives a force in the direction indicated by F in the drawing.

Here, let us consider the force exerted on the cam groove side surface 9 of the cam groove 7d of the cam frame 6 that comes into contact with the biasing pin 4. Since the cam groove side surface 9 is inclined with respect to the biasing force F, let us consider a component force Fa in the radial direction of the cam frame 6 (upward in the drawing) and a component force Fb in the optical axis direction of the cam frame 6 (leftward in the drawing).

The cam groove side surface 8 of the cam groove 7a is pressed against the cam pin 3a by the reaction force of the component force Fb.

Consequently, looseness between the cam groove 7a and the cam pin 3a is completely eliminated, and the relative positions of the cam frame 6 and the cam pin 3a are fixed.

FIG. 4B is a cross section of the cam pin 3b at a different position from that of the cam pin 3a.

In FIG. 4B, a force that constantly presses in the positive radial direction is exerted on the lens holding frame 1 by the reaction force of the compression coil spring 5. Because of this force, a force is exerted on the cam pin 3b in the direction of being pushed into the bottom of the cam groove 7b, so that looseness of the cam pin 3b is completely eliminated, and the relative positions of the cam frame 6 and the cam pin 3b are fixed.

Although not depicted in the drawings, another cam pin 3c is in the same state as in FIG. 4B.

Since looseness of the cam pins 3a, 3b, and 3c is completely eliminated, and the positions of the cam pins 3a, 3b, and 3c with respect to the cam frame 6 are thus fixed, there will be no looseness between the cam frame 6 and the cam frame 6, and the position of the lens holding frame 1 with respect to the cam frame 6 will be completely fixed.

If there is looseness between the cam frame 6 and the lens holding frame 1, and the position of the lens holding frame 1 is not fixed, then the position of the lens 2 in the optical system may change and resolution may suffer depending on the orientation in which the camera is held, and the like. Alternatively, the position of the lens 2 may shift during zooming, resulting in focus blurring or the image shake, but with the configuration of Embodiment 1, a high-quality lens barrel can be provided in which positional deviation of the lens 2 related to the orientation in which the camera is held or to zooming is reduced, and there is no focus burring or image shake even when capturing a moving picture while zooming.

In Embodiment 1, the compression coil spring 5 that biases the biasing pin 4 is more effective at suppressing looseness when the spring force is higher. However, if the spring force is too high, the frictional force during drive will be too great, resulting in side effects that the lens barrel does not operate, or that there is greater wear and the service life of the lens barrel is shortened. Accordingly, it is undesirable for the spring force of the compression coil spring 5 to be too high.

The conditions for effectively suppressing looseness with the minimum spring force will be described in brief.

Looseness of the lens holding frame 1 can be broadly classified into looseness in the radial direction and looseness in the optical axis direction.

Since the mass of the lens holding frame 1 is constant, looseness in the radial direction and looseness in the optical axis direction can both be suppressed by making the radial force Fa equal to the optical axis direction force Fb, and biasing at the minimum necessary force.

Let us now consider the conditions for making the force Fa in the radial direction equal to the force Fb in the optical axis direction.

In FIG. 4A, α is the angle formed by the radial direction of the cam frame 6 and the cam groove side surface 9 on which the biasing pin 4 of the cam groove 7d slides. When the coefficient of friction between the cam groove side surface 9 and the biasing pin 4 is negligible, the force Fa in the radial direction and the force Fb in the optical axis direction become equal when α is 45°.

The cam frame 6 of the lens barrel is generally lubricated with a fluorine-based lubricant or the like, but the friction coefficient is usually about 0.01 to 0.2 when lubrication is done with a fluorine-based lubricant.

Here, when the coefficient of friction between the cam groove side surface 9 and the biasing pin 4 is taken into account, the conditions under which the force Fa in the radial direction and the force Fb in the optical axis direction are equal are as follows.

α=44.4° when the coefficient of friction is 0.01
α=33.7° when the coefficient of friction is 0.2

Therefore, in general, when the following condition (1):

$$33.7° \leq \alpha \leq 44.4° \qquad (1)$$

is satisfied, the force Fa in the radial direction will be substantially equal to the force Fb in the optical axis direction, and biasing will be at the minimum force, allowing both looseness in the radial direction and looseness in the optical axis direction to be effectively suppressed.

In Embodiment 1, an example is given in which three cam pins 3a, 3b, and 3c are fixed and supported by the lens holding frame 1. However, the configuration may instead be such that just one cam pin is fixed and supported by the lens holding frame 1, and the orientation of the lens holding frame is determined by providing a shaft that restricts the inclination and eccentricity of the lens holding frame with respect to the optical axis direction. Alternatively, the configuration may be such that there are two cam pins fixed and supported by the lens holding frame, and a guide mechanism is provided for regulating the inclination and eccentricity of the lens holding frame with respect to the optical axis direction. Other configurations are also possible.

Here, whether there is one or two cam pins fixed and supported by the lens holding frame 1, there is preferably just one biasing pin 4 in either case. If there were a plurality of biasing pins 4, this would produce a state in which a plurality of forces are exerted on the lens holding frame 1 from different directions by the biasing pins 4, and a state in which the orientation of the lens holding frame is unstable.

On the other hand, when there is just one biasing pin 4, the force is always exerted on the lens holding frame in just one direction, so the orientation of the lens holding frame is stable.

Therefore, regardless of the number of cam pins fixed and supported by the lens holding frame 1, there is preferably just one biasing pin 4.

Furthermore, Embodiment 1 shows a configuration in which the cam pins 3a, 3b, and 3c are formed integrally with the lens holding frame 1 by resin injection molding, but it should go without saying that the effect will be the same when the cam pins 3a, 3b, and 3c are formed by metal cutting or the like and apart from the lens holding frame 1, and are fixed by press-fitting to the lens holding frame 1.

Furthermore, Embodiment 1 shows a case in which the biasing pin 4 is biased and supported in the radial direction with respect to the lens holding frame 1, but it should go without saying that the effect will be the same when the biasing pin 4 and the cam pin 3a are biased and supported in the direction of moving apart from each other in the optical axis direction, or when they are biased and supported in the direction of moving closer together in the optical axis direction.

Furthermore, Embodiment 1 shows a configuration in which the biasing pin 4 is biased by the compression coil spring 5, but it should go without saying that the effect will be the same when another biasing method is used, such as with a configuration in which a leaf spring or a torsion coil spring is used, or a configuration in which the shape of the lens holding frame 1 is devised so that the support portion of the biasing pin 4 of the lens holding frame 1 is elastically deformed.

Furthermore, in Embodiment 1, the lens 2 is directly fixed to the lens holding frame 1, but the result is the same when it is held indirectly, such as when the lens 2 is held via a drive mechanism that moves with respect to the lens holding frame 1.

Embodiment 2

Embodiment 2 shows a configuration in which Embodiment 1 is further improved on.

Embodiment 2 will now be described with reference to FIGS. 5A to 8B.

FIGS. 5A to 5D are diagrams showing the configuration of the lens holding frame unit in Embodiment 2.

Figure 5A:
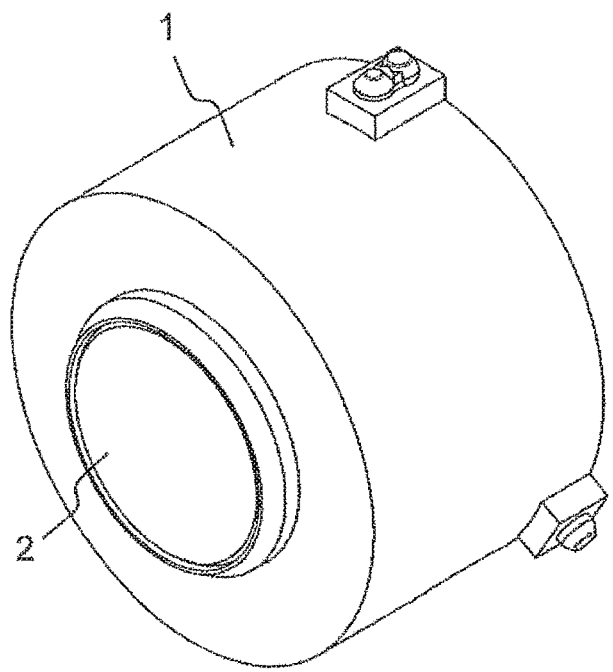
FIG. 5A is an oblique view of the configuration of the lens holding frame unit in Embodiment 1.
Figure 5B:
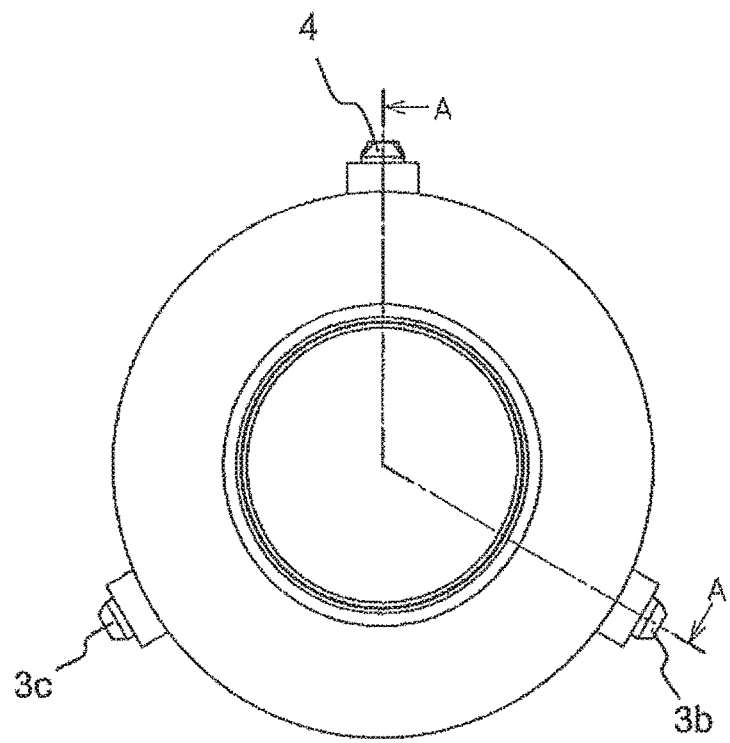
FIG. 5B is a front view of the configuration of the lens holding frame unit in Embodiment 1.
Figure 5C:
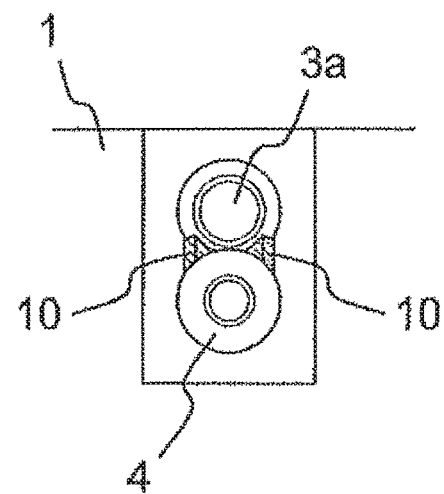
FIG. 5C is a top view showing the configuration of the lens holding frame unit in Embodiment 1.
Figure 5D:
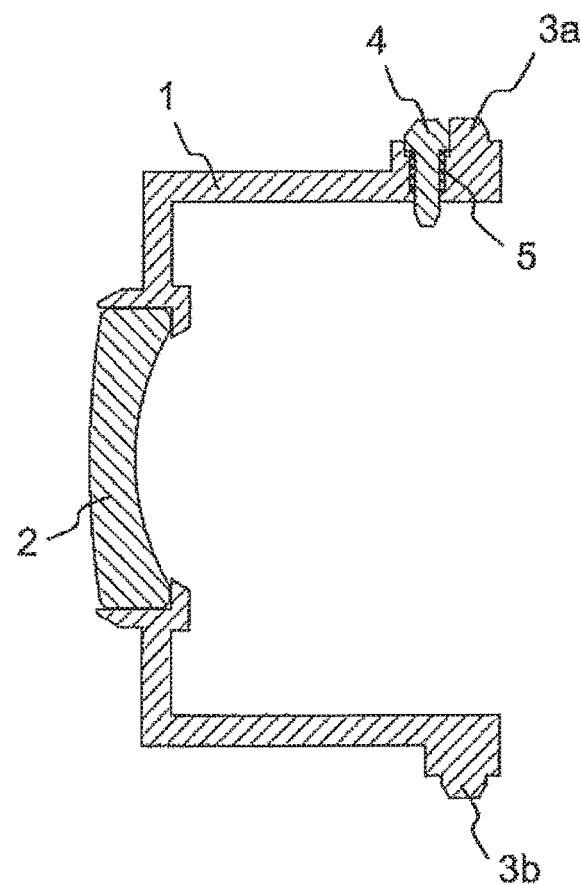
FIG. 5D is a cross section along the A-A line in FIG. 5B.

FIG. 5A is an oblique view, FIG. 5B is a front view, FIG. 5C is a top view, and FIG. 5D is an A-A cross section.

In Embodiment 1, the cam pin 3a that are fixed and supported by the lens holding frame 1, and the biasing pin 4 that is biased and supported are spaced apart in the optical axis direction, but in Embodiment 2, the biasing pin 4 is disposed closer to the conical surface of the cam pin 3a so as to partially bite into it.

Also, a reinforcing portion 10 that protrudes from the conical surface of the cam pin 3a is integrally formed on the biasing pin 4 side of the cam pin 3a.

Thus disposing the biasing pin 4 so that it partially bites into the cam pin 3a allows the portion of the lens holding frame 1 that supports the cam pin 3a and the biasing pin 4 to be smaller in the optical axis direction than in Embodiment 1.

Also, providing the cam pin 3a with the reinforcing portion 10 protruding from the conical surface allows the cam pin 3a to be reinforced and the strength of the cam pin 3a to be increased.

Figure 6A:
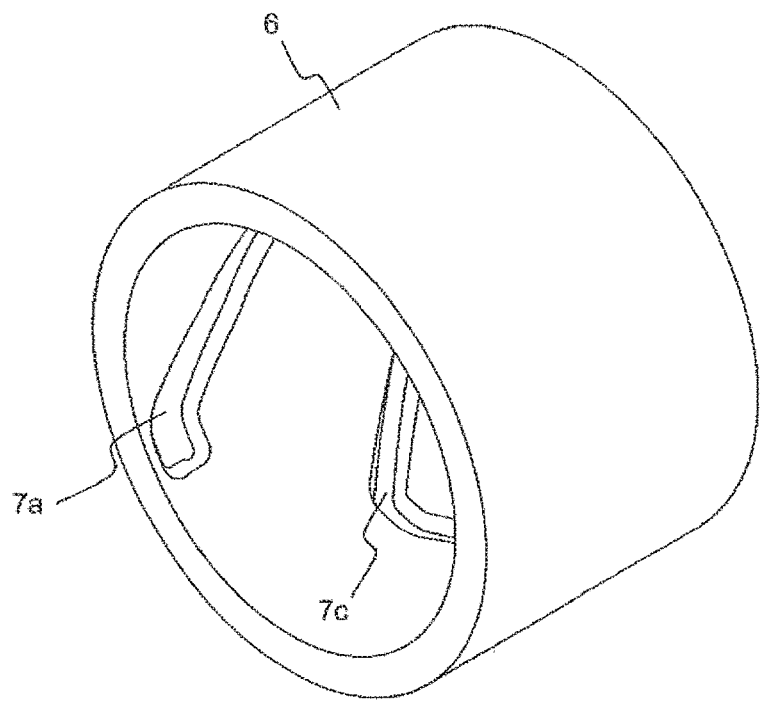
FIG. 6A is an oblique view of the configuration of the cam frame in Embodiment 1.
Figure 6B:
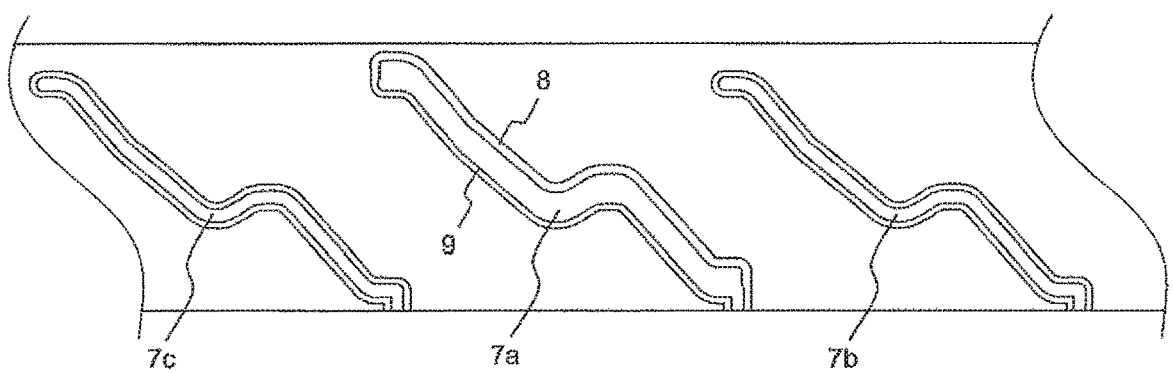
FIG. 6B is a development view of the inner surface of the cam frame in FIG. 6A.

FIGS. 6A and 6B are diagrams showing the configuration of the cam frame 6 in Embodiment 2.

FIG. 6A is an oblique view of the cam frame, and FIG. 6B is a developed view of the inner surface.

In Embodiment 1, the cam groove 7a that engages with the cam pin 3a and the cam groove 7d that engages with the biasing pin 4 are separately provided to the cam frame 6, spaced apart in the optical axis direction. Embodiment 2 differs from Embodiment 1 in that the cam groove side 9 that engages with the biasing pin 4 and the cam groove side 8 that engages with the cam pin 3a are formed as a single cam groove 7a.

That is, the biasing pin 4 and the cam pin 3a can slide along the cam groove 7a while the biasing pin 4 is touching the cam groove side surface 9 and the cam pin 3a is touching the cam groove side surface 8.

During normal operation, the cam pin 3a is in contact with only the cam groove side surface 8 of the cam groove 7a, and the biasing pin 4 is in contact with only the cam groove side surface 9 of the cam groove 7b, so this configuration poses no problem in operation, and the since the cam frame 6 needs only enough space for one cam groove 7a, the size of the cam frame 6 in the optical axis direction can be reduced as compared with Embodiment 1.

Figure 7A:
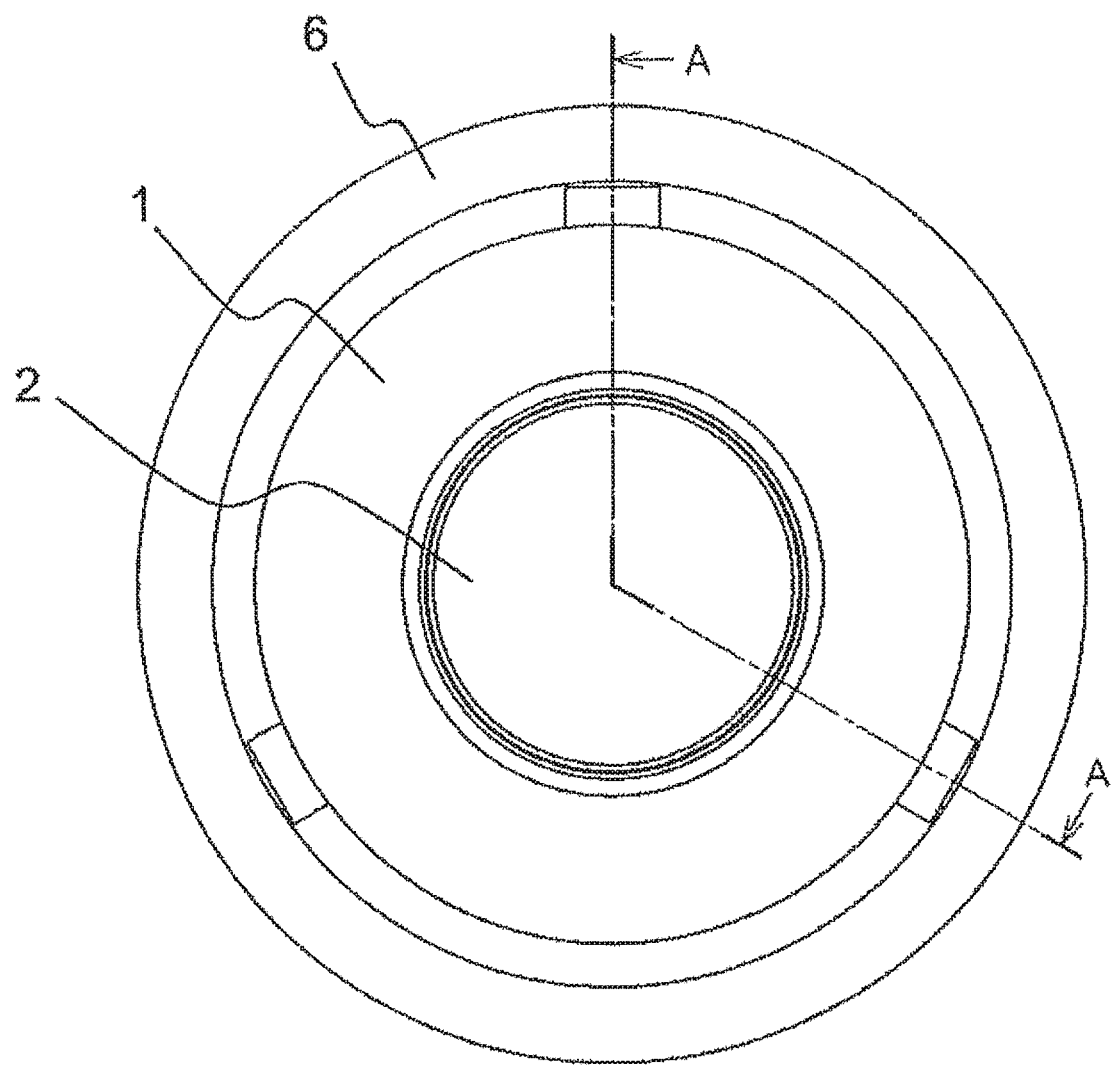
FIG. 7A shows a state in which the lens holding frame unit and the cam frame according to Embodiment 1 are assembled.
Figure 7B:
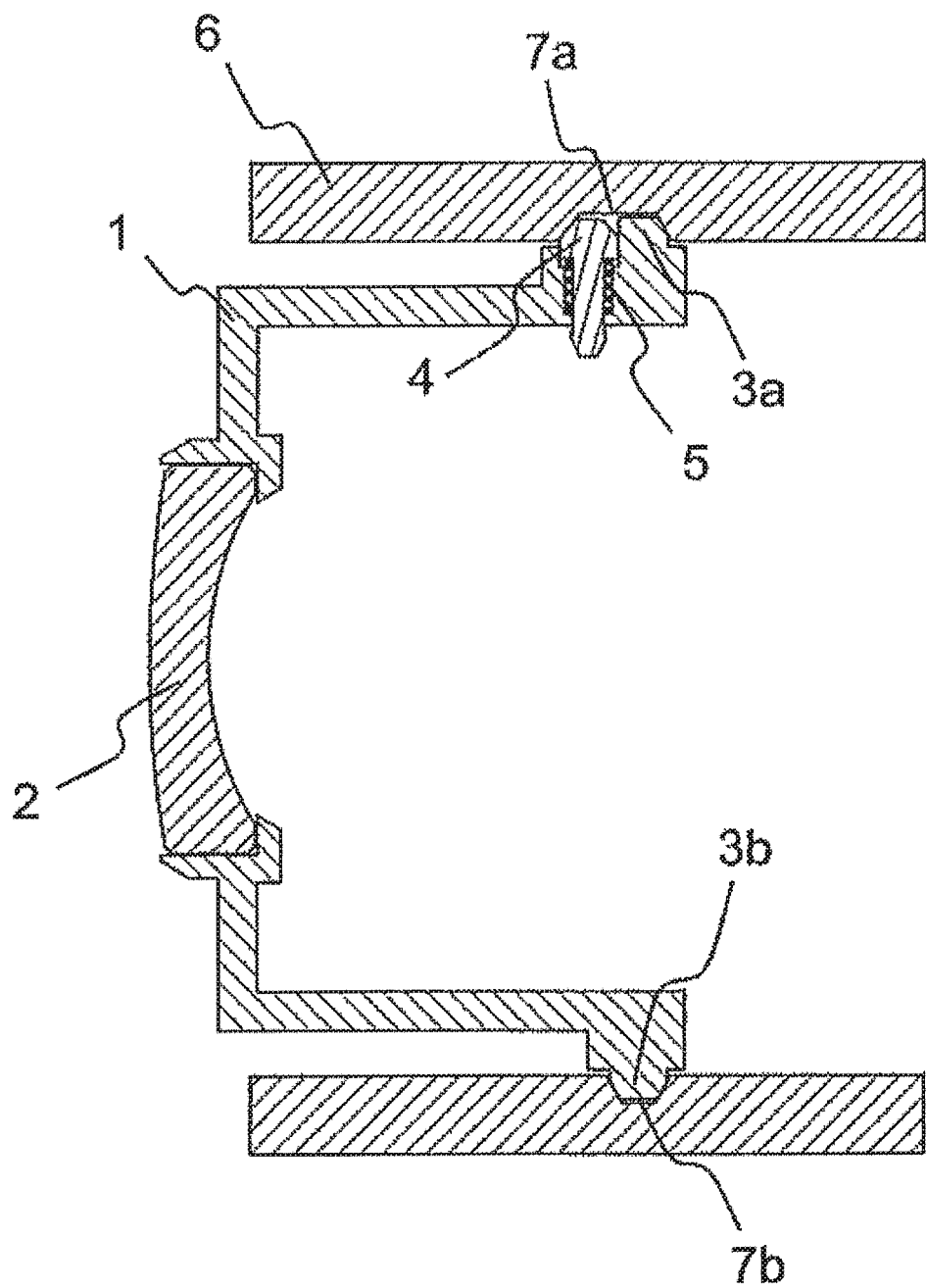
FIG. 7B is a cross section along the A-A line in FIG. 7A.

FIGS. 7A and 7B are diagrams showing a state in which the lens holding frame 1 and the cam frame 6 of Embodiment 2 have been put together.

Figure 8A:
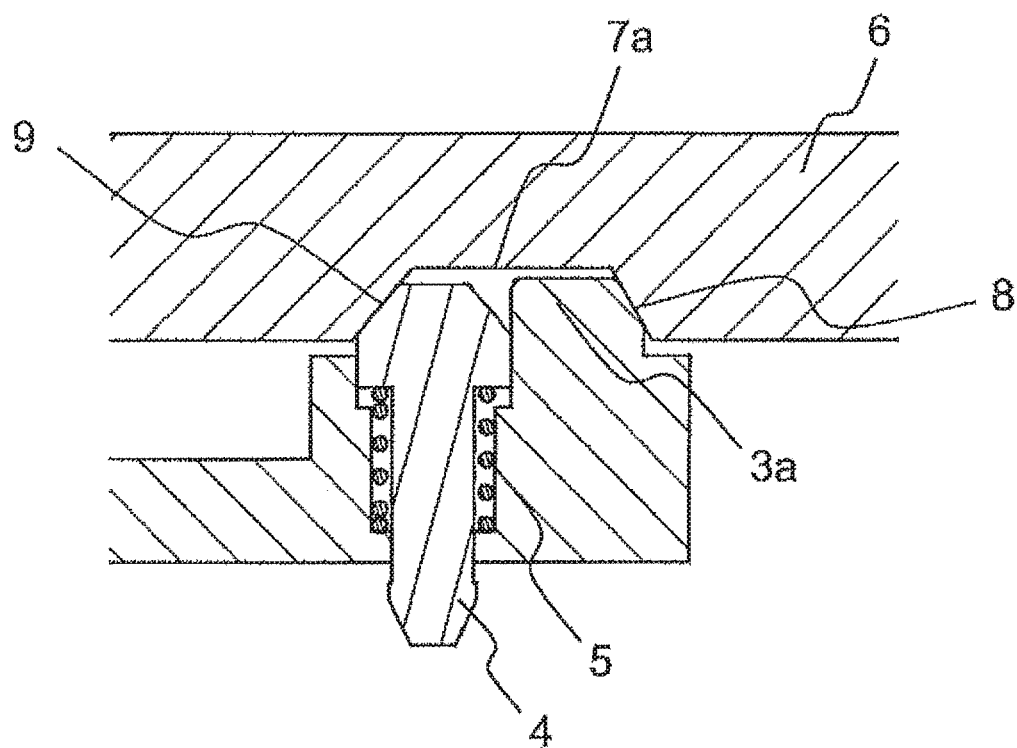
FIG. 8A is a cross sectional detail view of the engaged state of the cam pins, biasing pin, and cam grooves according to Embodiment 1.
Figure 8B:
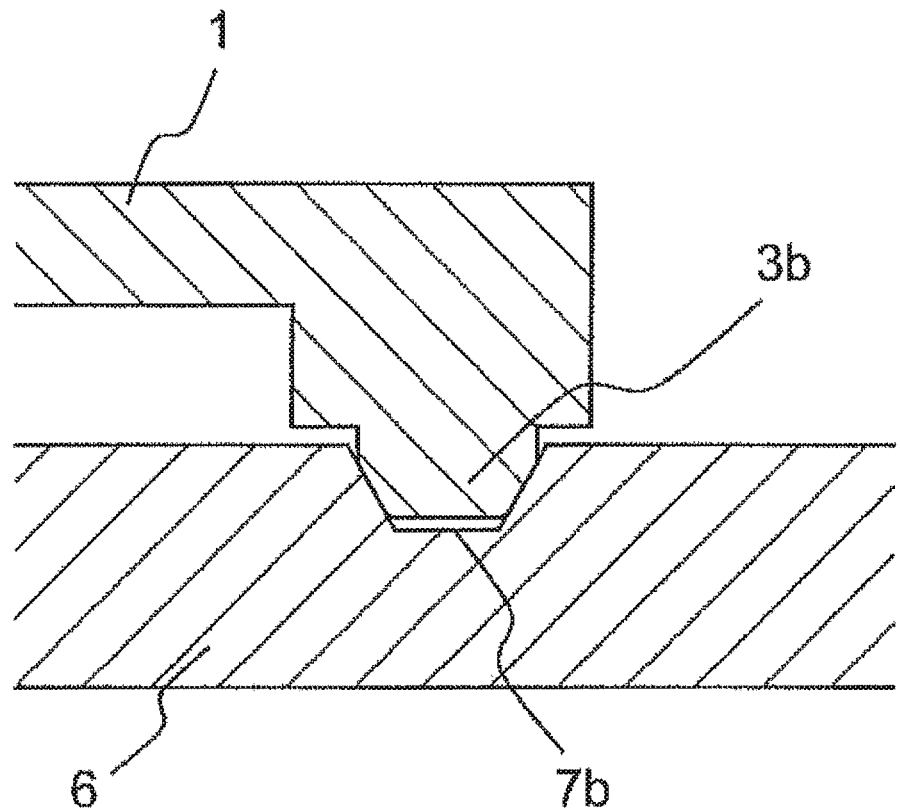
FIG. 8B is a cross sectional detail view of the engaged state of the cam pins, biasing pin, and cam grooves according to Embodiment 1.

FIGS. 8A and 8B are detailed cross sections showing the engaged state of the cam pin, the biasing pin, and the cam groove in Embodiment 2.

The effects of suppressing looseness and fixing the position of the lens holding frame in Embodiment 2 are exactly the same as those in Embodiment 1.

Just as in Embodiment 1, because the cam groove side surface 9 that engages with the biasing pin 4 and the cam groove side surface 8 that engages with the cam pin 3a are formed as a single cam groove 7a, the size of the cam frame 6 in the optical axis direction can be kept small, and the lens barrel as a whole can be made more compact.

Other Embodiments

As described above, Embodiments 1 and 2 are given as examples of the technology disclosed in the present application. However, the technology disclosed herein is not limited to this, and can also be applied to embodiments that involve modifications, substitutions, additions, omissions, and the like. Also, it is possible to create new embodiments by combining the constituent elements described in Embodiments 1 and 2 above.

In view of this, some other embodiments will be given below.

In Embodiment 1, three cam pins 3a, 3b, and 3c that were fixed and supported by the lens holding frame 1 were described as examples of cam pins. There may be at least one cam pin. Therefore, the number of cam pins is not limited. As discussed above, the configuration may be such that just one cam pin is fixed and supported by the lens holding frame 1, and a shaft for regulating the inclination and eccentricity of the lens holding frame with respect to the optical axis direction is provided to determine the orientation of the lens holding frame. Alternatively, as discussed above, the configuration may be such that two cam pins are fixed and supported by the lens holding frame, and a guide mechanism for regulating the inclination and eccentricity of the lens holding frame with respect to the optical axis direction is provided. Other configurations are also possible. Regardless of the number of cam pins fixed and supported by the lens holding frame 1, it is preferable for there to be just one biasing pin 4.

Also, in Embodiment 1, for example, the configuration is such that the cam pins 3a, 3b, and 3c are formed integrally with the lens holding frame 1 by resin injection molding, but it should go without saying that the effect will be the same when the cam pins 3a, 3b, and 3c are formed by metal cutting or the like and apart from the lens holding frame 1, and are fixed by press-fitting to the lens holding frame 1.

Also, Embodiment 1 showed a case in which the biasing pin 4 was biased and supported in the radial direction with respect to the lens holding frame 1, but it should go without saying that the effect will be the same when the biasing pin 4 and the cam pin 3a are biased and supported in the direction of moving apart from each other in the optical axis direction, or when they are biased and supported in the direction of moving closer together in the optical axis direction.

Also, in Embodiment 1, for example, the configuration is such that the biasing pin 4 is biased by the compression coil spring 5, but it should go without saying that the effect will be the same when another biasing method is used, such as with a configuration in which a leaf spring or a torsion coil spring is used, or a configuration in which the shape of the lens holding frame 1 is devised so that the support portion of the biasing pin 4 of the lens holding frame 1 is elastically deformed.

Also, in Embodiment 1, for example, the lens 2 is directly fixed to the lens holding frame 1, but the result is the same when it is held indirectly, such as when the lens 2 is held via a drive mechanism that moves with respect to the lens holding frame 1.

INDUSTRIAL APPLICABILITY

The present disclosure can be applied to a lens barrel used in a digital still camera or the like.

REFERENCE SIGNS LIST

1 lens holding frame
2 lens
3a, 3b, and 3c cam pins
4 biasing pin
5 compression coil spring
6 cam frame
7a, 7b, and 7d cam grooves
8 cam groove side surface (side surface that engages with cam pins)
9 cam groove side surface (side surface that engages with biasing pin)
10 reinforcing portion
11 lens holding frame
13a and 13b fixed cam pins
14a and 14b biasing cam pins
16 cam frame
17a, 17b, 17d, 17e, and 17f cam grooves

The invention claimed is:

1. A lens barrel, comprising:
a lens holding frame that holds lenses;
at least two cam pins that are provided to the lens holding frame and are fixed and supported by the lens holding frame so as to protrude toward a radial direction as a center of an optical axis of the lens;
a biasing pin that is provided to the lens holding frame and protrudes toward the radial direction near a first cam pin of the at least two cam pins of the lens holding frame, and is supported so as to bias to a predetermined direction; and
a cam frame that has a first cam groove that engages with the first cam pin and includes a first side surface inclined with respect to the radial direction, a second cam groove that engages with the biasing pin and is provided on an opposite side relative to the first side surface in the optical axis direction and includes a second side surface inclined with respect to the radial direction, and a third cam groove that engages with a second cam pin of the at least two cam pins,
wherein the second cam groove that engages with the biasing pin contacts the biasing pin on the second side surface in the optical axis direction, and the first cam groove that engages with the first cam pin near the biasing pin engages contacts the first cam pin on the first side surface on the opposite side in the optical axis direction from the second side surface that contacts with the biasing pin, and
the third cam groove engages with the second cam pin in a state in which the second cam pin is biased in a direction of being pushed into the bottom of the third cam groove, by a biasing force of the biasing pin.

2. The lens barrel according to claim 1,
wherein the first and the second cam groove have a first side surface contacting with the biasing pin and a second side surface contacting with the first cam pin, which are formed as a single groove.

3. The lens barrel according to claim 1,
wherein the biasing pin is biased and supported in the radial direction, and
if we let α be the angle formed by the second side surface of the second cam groove contacting with the biasing pin, and the radial direction of the cam frame, the following condition (1) is satisfied:

$$33.7° \leq \alpha \leq 44.4° \tag{1}$$

4. The lens barrel according to claim 1,
wherein the biasing pin is supported such that a part of the biasing pin encroaches upon a shape of the first cam pin.

5. The lens barrel according to claim 1, wherein the biasing pin provides a biasing force toward the radial direction.

6. The lens barrel according to claim 5, wherein the biasing pin provides the biasing force in the radial direction in a state of being in contact with the second side surface of the second cam groove to generate a component force in the optical axis direction.

7. The lens barrel according to claim 6, wherein the first cam groove that engages with the first cam pin is pushed into the first cam pin by a reaction force of the first side surface contacting with the biasing pin with respect to the component force generated by the biasing pin.

8. The lens barrel according to claim 1, wherein the first cam pin, the second cam pin and the biasing pin engage with the first cam groove, the third cam groove and the second cam groove, respectively, in a regular state.

* * * * *